United States Patent

Stromberg

[15] 3,674,671
[45] July 4, 1972

[54] ELECTRODEPOSITION METHOD AND PRODUCT

[72] Inventor: Sanford E. Stromberg, Tonawanda, N.Y.
[73] Assignee: Textron, Inc.
[22] Filed: Feb. 26, 1969
[21] Appl. No.: 802,633

[52] U.S. Cl. ....................................................204/181
[51] Int. Cl. .............................B01k 5/02, C23b 13/00
[58] Field of Search...................................204/181

[56] References Cited

UNITED STATES PATENTS

| | | | |
|---|---|---|---|
| 3,399,126 | 8/1968 | Turner | 204/181 |
| 3,399,128 | 8/1968 | Brewer et al | 204/181 |
| 3,362,899 | 1/1968 | Gilchrist | 204/181 |
| 3,408,278 | 10/1968 | Stoodley | 204/181 |

*Primary Examiner*—Howard S. Williams
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

Black iron oxide-containing coatings when deposited on solid substrates and cured exhibit sufficient electrical conductivity to permit application of a topcoat by electrodeposition. The black iron oxide-containing coatings can be formed on electrically conductive, solid substrates by electrodeposition. The coatings exhibit outstanding properties.

9 Claims, No Drawings

ELECTRODEPOSITION METHOD AND PRODUCT

This invention relates to the formation of coatings on solid substrates with the use of compositions having as an essential component black iron oxide which imparts electrical conductivity to the coatings thereby permitting the successful use of articles bearing such coatings as substrates for further deposition of overlying coatings by electrophoresis or electrodeposition. Moreover, the coatings containing black iron oxide exhibit outstanding properties in terms of electrophoretic characteristics, adherence to substrates and corrosion resistance.

There are available in the art many descriptions of methods for coating electrically conductive objects by electrophoresis or electrodeposition, as well as many compositions which are suitable for use in such procedures. In the usual electrodeposition system, the article to be coated is placed in an aqueous bath and the article itself is either electrically conductive or bears an electrically conductive coating. The aqueous bath contains a water-dispersible, film-forming or coating component which is often an organic resin bearing carboxyl groups. In the system the article to be coated forms the anode in a direct current circuit with the vessel holding the aqueous bath or another conductor in the bath serving as the cathode. Direct current from an outside source is applied through the bath via the electrodes and the film-forming material becomes coated on the anode with the thickness of the resulting film being dependent on various factors such as the composition of the film-forming material, the applied voltage and the system geometry. In any event, as coating proceeds, the resistance of the article or anode to current flow increases until a relatively uniform coating covers essentially the entire article. Completion of the coating process is generally indicated when the current becomes substantially constant. By this procedure it is convenient and economical to obtain uniform coating of all portions of the article even when it has an intricate surface configuration.

In many instances it is desirable to form multiple coatings on solid substrates with at least one of the topcoatings, and preferably a plurality or even all of the coatings, being applied by electrodeposition. If a topcoating is to be formed by electrodeposition there is necessitated the use of an undercoating which is electrically conductive in order that the topcoating can be applied thereover by electrophoresis. Such undercoatings can be formed by providing solid, electrically conductive particles in the coating composition. The particles must, however, not prevent the coating from forming a relatively nonconductive film as the undercoating is applied by electrophoresis; yet when the coating is cured, it must exhibit sufficient electrical conductivity to permit application of a topcoating by the electrodeposition technique. Moreover, the solid particles must be economically priced and must not unduly adversely affect the desirable properties of the coating. Also, it is advantageous if the coating containing such solids be amenable to application to articles, especially electrically nonconductive articles, by other techniques such as spraying, dipping, etc., whereby upon curing of the coating the article can be further coated by electrodeposition. The topcoats may or may not be electrically conductive after curing.

The present invention is based on the finding that black iron oxide can be used as the essential electrically conductive solids in coating materials and outstanding results obtained when the cured coatings containing the black iron oxide are to be topcoated by electrodeposition. The coatings resulting from the use of black iron oxide-containing, film-forming materials are satisfactorily electrically conductive after curing of the coatings to enable further coating by electrophoresis whether the black iron oxide bearing film is deposited on an electrically conductive article, for instance, by electrodeposition, or on an electrically nonconductive article through the use of other techniques such as spraying, dipping, etc. In any event, articles bearing the black iron oxide-containing coating have exhibited outstanding properties in terms of adherence to substrates, electrical conductivity, surface properties and corrosion resistance.

Thus the essential electrically conductive particles employed in the film-forming materials of the present invention are black iron oxide which is $Fe_2O_3$ and is often available commercially in admixture with other iron oxides. The black iron oxide is usually a major proportion of the mixture which is preferably at least about 65, or often at least about 70, weight % $Fe_2O_3$. The black iron oxide is finely divided and is frequently composed primarily of particles having a size of about 0.1 to 1.5 microns, preferably about 0.25 to 0.5 microns, to enhance the ease of dispersing the solids in the aqueous bath and provide smoother and more durable and homogeneous films. In the black iron oxide-containing coatings of this invention and thus in the aqueous baths employed in depositing such coatings, the film-forming component, for instance, the carboxyl group containing organic resin, is generally at least about 0.5 part by weight per part of black iron oxide and may be up to about 10 or more parts by weight per part of black iron oxide. Preferably, the film-forming material is about 2 to 4 parts by weight per part of black iron oxide in the coating.

The black iron oxide exhibits satisfactory travel times in the aqueous bath during electrodeposition which is another advantageous characteristic when the electrically conductive coatings are formed by this technique. Aside from imparting outstanding electrically conductive characteristics to the coatings of this invention the use of black iron oxide provides coatings of good salt spray and corrosion resistance and good adhesion to substrates, as well as the property of good adhesion of topcoats to the black iron oxide coating. Also, in applying the black iron oxide-containing coatings by electrodeposition good voltage flexibility is possible and relatively high voltages can be tolerated without film disruption. The formation of topcoatings on the black iron oxide-containing coatings can be at relatively low voltages which can improve the appearance and hiding power of the topcoats.

In the electrodeposition of the black iron oxide-containing coatings and in the formation of topcoats thereover by electrodeposition, conditions known in the art are suitable. Thus, the voltage is above the threshold deposition voltage of the film-forming material and generally does not exceed values just below the rupture voltage of the coating. Frequently, the voltages are of the order of about 20 or 500 volts, preferably about 40 to 200 volts, and the voltage applied in forming topcoats is often greater than that used in depositing the undercoat. Temperatures of the aqueous bath maintained during electrodeposition are generally about 60° to 125° F. or more, preferably about 70° to 95° F. The film-forming materials and the black iron oxide and any other pigments or materials, which remain in the cured film, are often a minor proportion, for instance, about 2 to 35 weight percent, preferably about 5 to 15 weight percent, based on the total weight of the aqueous bath. Thus, the water can be about 65 to 98 weight percent of the aqueous bath, preferably about 85 to 95 weight percent. Of course, the bath contains the anode and cathode in the usual spaced apart relationship and the bath can be agitated to maintain uniform temperatures and dispersion of the coating components. After electrodeposition, the coating is cured, for instance, at temperatures up to about 500° F., preferably about 200° to 400° F., for suitable periods of time, for instance, about 2 to 60 minutes.

The cured film-forming material bearing the black iron oxide formed as a coating on the anode, is sufficiently electrically conductive, whether the coating has been applied by electrodeposition or by other means, to permit application of an overlying film-forming material by electrodeposition. Where the initial coating on the article is to be applied by electrodeposition the article or anode must be electrically conductive and is usually metallic in nature. Suitable nonconductive substrates can also be used providing an electrically conductive coating is applied by a suitable technique, and often the nonconductive materials may be composed of wood, plastic, glass or other materials. Film thicknesses formed by electrodeposition are frequently about 0.5 to 1.5 mils, preferably about 0.7 to 1 mil.

The film-forming materials employed in the black iron oxide-containing and other coatings applied by this invention are water thinnable or water-soluble or can be made so, and are those materials often characterized as electrodepositable, film-forming materials. Thus, the film-forming materials form current-carrying anions in the bath and deposit on the anode in a form in which they are relatively water- and electrically resistant materials. The film-forming material acts as a binder for the pigment of the coating and frequently the film-forming material is an organic resin. Many of these film-forming materials are known in the art and are often composed to a major extent of a synthetic resin made from one or more carboxylic acids or their anhydrides or esters. Among the useful resins are those having an electrical equivalent weight between about 1,000 and 20,000 and an acid number or acid value of about 20 to 300, preferably an acid number of about 30 to 150. Electrical equivalent weight is described in U.S. Pat. No. 3,230,162, herein incorporated by reference.

The film-forming resins which can be applied by the coating techniques of this invention can be formed by polymerization of, for instance, ethylenically-unsaturated, carboxyl group

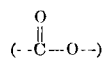

containing monomers, with other ethylenically unsaturated monomers. Frequently, the latter monomers have up to about 30, preferably up to about 12, carbon atoms, while the ethylenically unsaturated, carboxyl group-containing monomers of ten have up to about 20 carbon atoms but may contain considerably more, for instance, in the case of polyesters formed from unsaturated fatty acids and polyols, with or without drying and semi-drying oils. Although the carboxylic group-containing monomer can be monocarboxyl, e.g. acrylic acids and esters and lower alkyl-substituted acrylic acids and esters, it is preferred that it be composed to a major extent of polycarboxyl materials, i.e. having two or more

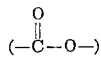

groups, often having four to about 12 carbon atoms such as trimellitic acid, adipic acid, maleic anhydride, itaconic acid, phthalic anhydride, itaconic anhydride, fumaric acid, etc. and their lower alkyl esters. The other ethylenically unsaturated monomers usually comprise a minor amount, say up to about 25 or more weight percent, of the resin and include many materials, especially vinyl members such as styrene, acrylonitrile, butadiene, vinyl toluene, butylenes, octenes and similar monomers. The drying oils and semi-drying oils are represented by, for instance, linseed oil, oiticica oil, safflower oil, perilla oil, tung oil, soybean oil and other suitable oils including bodied oils. The polyol component in the oils is generally glycerol since the oils for the most part are available as glycerides. Other useful polyols such as ethylene glycol, neopentyl glycol, pentaerythritol and trimethylopropane can be employed in modifying the oils or in forming polyesters, and these polyols often have up to about 12 carbon atoms. The polyol component can also be a polyester polyol.

The various film-forming polymers employed in this invention can be extended with materials which form thermosetting coatings such as non-heat-reactive phenol aldehyde resins, amine-aldehyde condensation products and polyepoxy components. Thus, among the various suitable film-forming resins, are the alkyd resins and their mixtures with amine-aldehyde or phenolic materials, with or without further modification with vinyl monomer. Varieties of these resin forming materials are described in British Pat. Nos. 1,096,067 and 1,081,767 and U.S. Pat. Nos. 3,230,162; 3,362,899 and 3,364,162, all incorporated herein by reference. These various resinous materials are usually present in the aqueous coating baths of this invention as dissolved salts, preferably volatile nitrogenous base salts of the resin such as the ammonium salts or water-soluble aliphatic amine salts whose salt components are relatively volatile and can be removed during curing of the coatings.

As previously noted, the coating compositions, whether black iron oxide-containing or not, employed in the method of this invention can contain other materials such as other solid pigments, paint-type driers, surfactants to aid in dispersing the film-forming and pigment components, non-ionic organic liquids to assist in solubilization of the film-forming resin components and other desirable ingredients. In pigmented coatings, whether black iron oxide containing or not, the amount of film-forming material to pigment weight ratio is often about 0.25 to 20:1, preferably about 1 to 5:1.

This invention will be illustrated by the following specific examples.

EXAMPLE I 6,528 grams of maleinized drying oil resin prepared from linseed oil modified with about 15 weight percent maleic anhydride, were combined with 1,110 milliliters of (29 percent) ammonium hydroxide, 1,450 milliliters of n-butoxy ethanol and 366 milliliters of deionized water, giving a vehicle at 70 percent solids having a pH of about 7.5 to 8.0 and an acid value of 100. This resin vehicle was employed to produce a conductive black primer for use in electrodeposition by combining the following:

545 parts by weight of the vehicle
170 parts by weight of finely divided iron oxide containing about 76 weight percent black iron oxide ($Fe_2O_3$) and 24 weight % FeO
2.4 parts by weight of 6 percent cobalt naphthenate
2.4 parts by weight of 6 percent manganese naphthenate
19.5 parts by weight of 24 percent lead naphthenate
6,165 parts by weight of deionized water Electrically conductive films were deposited on steel panels (zinc phosphate-treated Bonderite 37) using an aqueous bath containing the foregoing described black primer in an amount sufficient to give 8 weight percent total nonvolatiles in the bath. In the electrodeposition the conditions employed were 50 volts for 60 seconds at 75° F. After deposition, the films were cured by baking for 30 minutes at 300° F. and the resultant films were approximately 0.8 mil thick.

A second resin was prepared from 5,240 grams of trimellitic anhydride, 7,090 grams of neopentyl glycol and 3,980 grams of adipic acid by cooking the mixture at 370° F. to an acid value of 55 to 60. The resulting material was mixed with 1,500 milliliters of dimethylethanolamine, 3,140 milliliters of ethyl ketone, 3,760 grams of Cymel XM-1116 which is a 100 percent non-volatile amino cross-linking agent and sufficient deionized water to give a vehicle of 40 percent solids and a pH of 7.0 to 7.5.

One hundred and fifty parts by weight of the resulting vehicle, 25 parts by weight of titanium dioxide and 860 parts of deionized water were combined to give a mixture containing 8 percent total solids. This composition was then employed to form white enamel topcoats over the electrically conductive black primer coat on the steel panels. During the electrodeposition to provide the topcoat, the conditions were 125 volts for 60 seconds at 75° F. The white topcoat films were cured for 30 minutes at 300° F. to give coatings with greater than 80° gloss, very good corrosion resistance, and excellent hardness and flexibility.

EXAMPLE II

A resin was prepared from 1,301 grams of tall oil fatty acids, 1,482 grams of phthalic anhydride, 647 grams of pentaerythritol and 357 grams of ethylene glycol. The mixture was cooked at 390° F. to an acid value of 40. The resulting resin was combined with 254 milliliters of dimethyl ethanolamine, 442 milliliters of butoxy diethylene glycol, 790 grams of Resimene 740, a high solids alcohol-modified melamine-formaldehyde resin, and sufficient deionized water to give a solution of 75 percent solids and a Ph of 7.5 to 8.0. Two coating compositions were prepared from this vehicle. The first coating was a conductive black iron oxide-containing material and the second coating was a white enamel formulation. The coatings were formulated as follows:

1.
1,000 parts by weight of the above vehicle
350 parts by weight of the iron oxide mixture of Example I
12,650 parts by weight of deionized water; and
2.
522 parts by weight of the above vehicle
172 parts by weight of titanium dioxide
3,910 parts of deionized water Using composition 1 electrically conductive films were deposited on zinc phosphate-treated steel panels at 75 volts for 60 seconds at 75° F. The resulting films were cured at 300° F. for 30 minutes and had thicknesses of about 0.7 to 0.9 mil. The white enamel topcoat, composition 2, was then deposited by electrodeposition over the electrically conductive base coat at 100 volts for 60 seconds at 75° F. The enamel topcoat was cured at 300° F. for 30 minutes and exhibited outstanding properties with respect to coverage and corrosion resistance.

EXAMPLE III

A steel panel coated with an electrically conductive primer according to Example II was subsequently covered by a white topcoat having the composition of that described in Example I. The white film which was applied at 125 volts for 60 seconds at 75° F. and cured at 300° F for 30 minutes had very good gloss and appearance.

EXAMPLE IV

The initial vehicle of Example I having 70 percent solids and a pH of 7.5 to 8.0 was used to prepare a black iron oxide base coating by combination of the following:
907 parts by weight of the vehicle
170 parts by weight of the iron oxide mixture of Example I
5,820 parts by weight of deionized water Employing the resulting film-forming material, electrically conductive films were electrodeposited on steel panels at 75 volts for 60 seconds at 75° F. The films were cured at 300° F. for 30 minutes and subsequently coated with a white enamel formulation as illustrated in Example I. The white topcoat was deposited at 150 volts for 60 seconds at 75° F. and subsequently cured at 300° F. for 30 minutes, giving a film having good gloss and appearance characteristics.

EXAMPLE V

This example illustrates the unsuitability of red iron oxide as a pigment for forming electrically conductive coatings by electrodeposition. A resin was formulated by cooking at 390° F. to an acid value of 40, a mixture of 1,301 grams of tall oil fatty acids, 1,482 grams phthalic anhydride, 647 grams of pentaerythritol and 357 grams of ethylene glycol. The cooked resin was mixed with 254 milliliters of dimethylethanolamine, 442 milliliters of butoxy diethylene glycol, 790 grams of Resimene 740 and sufficient deionized water to give a solution of 75 weight percent solids and a pH of 7.5 to 8.0.

Employing this vehicle, two black and one red coating compositions were formulated as follows:
1.
1,000 parts by weight of vehicle
350 parts by weight of iron oxide mixture of Example I
12,650 parts by weight of deionized water;
2.
1,000 parts by weight of vehicle
128 parts by weight of carbon black
9.847 parts by weight of deionized water; and
3.
1,000 parts by weight of vehicle
368 parts by weight of red iron oxide
12,607 parts by weight of deionized water.

Films based on each of compositions 1, 2 and 3 were deposited on zinc phosphate-treated steel panels by electrodeposition at 75 volts for 1 minute at 75° F. The resulting films were cured at 300° F. for 30 minutes. The cured black films from compositions 1 and 2 were electrically conductive, and, for instance, a white enamel topcoat could be formed over these electrically conductive films as described in the foregoing examples. On the other hand, the cured red films from composition 3 were not electrically conductive and thus an overlying topcoat could not be applied by electrodeposition.

By using composition 1, black iron oxide-containing films were deposited on steel panels at 50, 75, 100 and 125 volts, respectively, for 60 seconds at 75° F. The resulting films had thicknesses of 0.7 to 1.0 mil and smooth, homogeneous appearances. Composition 2 was deposited on steel panels at the same voltages and other conditions and at 100 and 125 volts the formulation have films which were above 1 mil thickness and were not homogeneous, although at 50 and 70 volts the films were smooth and homogeneous. Thus, the black iron oxide-containing coatings exhibited greater voltage flexibility than those containing carbon black. Moreover, when the steel panels bearing the carbon black-containing films were covered with a white topcoat, higher voltages were necessary to obtain acceptable appearance and hiding power than when coating the panels with the black iron oxide-containing coating. The greater voltages needed for the carbon black films also resulted in some cases in topcoats which were too thick and somewhat discolored.

Steel panels bearing the black iron oxide and carbon black films were also subjected to evaluation with respect to salt fog resistance. The film containing the black iron oxide exhibited better resistance since it remained in the salt fog chamber for approximately 200 hours before failure, while the film based on carbon black failed between 100 and 150 hours. Also, the film containing the black iron oxide was especially desirable as a primer coating since the gloss it exhibited was not so great as to deleteriously affect adhesion of a topcoat.

It is claimed:
1. A method for electrophoretically coating a solid substrate which comprises forming a cured, electrically conductive coating on said substrate, said coating being comprised of a film-forming polymer and finely divided black iron oxide pigment to impart electrical conductivity to said cured coating, and subsequently applying by electrodeposition over said cured coating a coating of electrodepositable film-forming polymer.
2. The coated article of claim 1.
3. The method of claim 1 in which the electrically conductive coating is applied to an electrically conductive substrate by electrodeposition from an aqueous bath of a carboxyl group containing, electrodepositable film-forming polymer.
4. The coated article of claim 3.
5. The method of claim 3 in which the subsequently applied coating is of a carboxyl group containing polymer.
6. The coated article of claim 5.
7. The method of claim 5 in which the weight ratio of film-forming polymer to black iron oxide is about 2 to 4:1.
8. The method of claim 7 in which the subsequently applied coating is pigmented.
9. The coated article of claim 8.

* * * * *